United States Patent [19]

Matsumura et al.

[11] Patent Number: 5,055,340

[45] Date of Patent: Oct. 8, 1991

[54] GRIP TAPE

[75] Inventors: Hiroshi Matsumura, Tokyo; Koji Nii, Yamanashi, both of Japan

[73] Assignee: Asahi Kagaku Kogyo Co., Ltd., Japan

[21] Appl. No.: 228,865

[22] Filed: Aug. 4, 1988

[30] Foreign Application Priority Data

Aug. 6, 1987 [JP] Japan .............................. 62-119803[U]
Aug. 6, 1987 [JP] Japan .............................. 62-119804[U]

[51] Int. Cl.$^5$ ..................... B32B 3/00; B62K 21/26; A61B 59/00

[52] U.S. Cl. ..................... 428/172; 428/137; 428/138; 428/158; 428/160; 428/167; 428/195; 428/196; 428/245; 428/246; 428/260; 428/272; 428/286; 428/290; 428/295; 428/311.1; 428/317.3; 428/318.4; 428/319.3; 428/346; 428/349; 428/354; 428/337; 428/339; 428/423.3; 428/424.6; 428/424.8; 428/425.5

[58] Field of Search .............. 428/156, 158, 159, 160, 428/167, 172, 195, 197, 198, 245, 246, 247, 260, 261, 262, 286, 288, 289, 290, 295, 317.1, 317.3, 317.7, 318.4, 319.3, 319.9, 343, 353, 354, 355, 349, 346, 196, 272, 289, 311.1, 337, 339, 423.3, 425.5, 424.8, 424.6, 500, 446; 81/489; 273/73 J, 75, 81 R, 81 B, 670 A, 670 B; 74/551.9

[56] References Cited

U.S. PATENT DOCUMENTS 3,457,919  7/1969  Harbard ............................ 428/353
3,853,598 12/1974  Raguse .............................. 428/353
4,303,724 12/1981  Sergeant ........................... 428/353
4,559,258 12/1985  Kiuchi ................................ 428/156
4,705,715 11/1987  DeCoste et al. .................. 428/246
4,781,957 11/1988  Brown et al. ..................... 428/156
4,837,070  6/1989  Weber et al. ..................... 428/172

FOREIGN PATENT DOCUMENTS 62-32043 12/1987 Japan .

Primary Examiner—Ellis P. Robinson
Assistant Examiner—Donald J. Loney
Attorney, Agent, or Firm—Lowe, Price, Leblanc & Becker

[57]  ABSTRACT

A grip tape for wrapping the gripping handle of a tennis racket, a badminton racket, a golf club, or the like which includes a porous flexible sheet with numerous thin holes provided by coating a polyurethane on a nonwoven fabric so as to provide the user with various effects such as a smooth touch feeling, shock-abosrbing, and anti-moisture effects because of the moderate flexibility and elasticity that it has. The grip tape further includes a number of projections in a desired pattern formed by applying a synthetic resin elastic layer on the upper surface, and by applying an elastic foam-expanded layer on the rear surface, so as to make possible its easy handling and increased non-slip and shock-absorbing effects, by which the grip gets to the user's hand with the most comfortable touch feeling.

7 Claims, 2 Drawing Sheets

GRIP TAPE

BACKGROUND OF THE INVENTION

1. Field of the Invention

The present invention relates to a grip tape for the grip of a racket for tennis, badminton, or a club for golf or the like, which is normally used by wrapping it around the grip part of above each sports equipment.

2. Description of the Prior art

Japan Patent Preliminary Publication No. 62-32043 has disclosed a grip tape material of this kind which incorporatively compounds a stout and not-easily-tearable skin of a material such as a nonwoven fabric, synthetic leather, natural leather or cloth with an elastic material such as rubber or other various expanding agents.

However, production of a conventional grip material of this kind requires some special apparatus so as to compound a skin with an elastic material, each of which is independently prepared, and in addition their perfect incorporation still faces an enormous difficulty, resulted in that they can be easily exfoliated from each other because of the user's perspiration caused by its frequent use. Furthermore, in the case that the grip surface directly touched by a user's hand is made of a normal cloth or a nonwoven fabric of synthetic resin fiber, it produces a coarse touch feeling, and also it grows sticky and slippery specially when these cloths, natural leather are wet by the user's sweat or rain.

Considering the problems that the conventional grip material has, the object of the present invention is to provide a grip tape characterized in that it is of a good hygroscopicity, it does not get slippery by rain or the sweated hand of the user and that it also has a moderate flexibility so as to provide its user with a pleasant touch feeling.

SUMMARY OF THE INVENTION

To achieve the above-mentioned object, the grip tape according to the present invention is characterized in that as shown in FIG. 1 and FIG. 2 a plurality of the projections 3 are formed on the upper surface 1a of the porous flexible sheet 1 by forming partially a plurality of synthetic resin elastic layers 2 with a required pattern thereon through printing or adhesion, and also different type of a plurality of the projections 3' are formed on the rear surface 1b by applying partially or continuously elastic foam-expanded layers in various patherns such as 4 and 4a as shown in FIGS. 5, 7 and 8.

In fact, this inventive grip tape provides a variety of embodiments in combination of the above materials applied on the upper surface and on the rear surface.

The flexible sheet 1 is produced by the following procedure. First, the polyurethane solution solved in a water-soluble organic solvent is soaked into a nonwoven fabric of synthetic resin fiber such as polyamid, polyethylene-terephtalate, and then it is submerged into water to get it solid, while at the same time the above solvent is extracted so as to produce a number of thin holes. Its thickness is preferably within the range between 0.4 mm and 0.8 mm. Instead of making the polyurethane solution soaked to the nonwoven fabric, a foam-expanded polyurethane resin solution can be coated on one or both faces so as to form a plain non-slip surface thereon. The surface 1a side of this flexible sheet 1 can be buffed through sueding or embossing, as is widely known.

The synthetic resin elastic layer 2 is formed by coating or printing urethane, acrylate, EVA, silicon resin, latex such as NBR and SBR, or coating a flexible PVC type paste or emulsion type resin liquid, which are all well-known methods.

The most preferable method is to apply a foam-expanded liquid components of these resins in compliance with the porous flexible sheet 1 so as to acquire susceptibility of water or hygroscopicity.

DETAILED DESCRIPTION OF THE EMBODIMENTS

Figure 1:
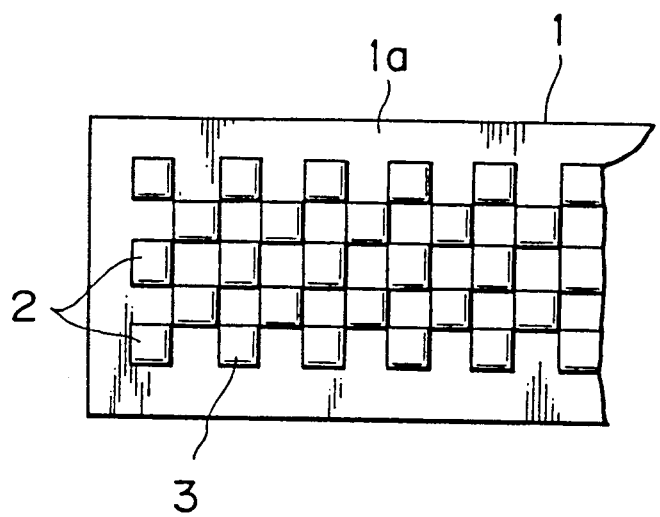
FIG. 1 is a plan view of an embodiment applied on the upper surface of the grip tape according to the present invention.
Figure 2:
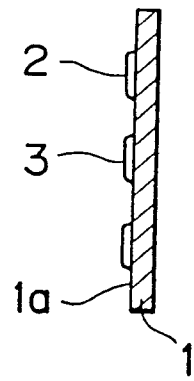
FIG. 2 is a sectional view of FIG. 1.

FIGS. 1 and 2 show embodiments in which a foam-expanded resin is printed in checkwise pattern only on the upper surface 1a of the porous flexible sheet 1 to form a synthetic resin elastic layer 2, so that projections 3 are formed on the same surface. Alternatively, zigzag or dotted pattern may also be formed apart from the above checkwise pattern, since the formation of the suitable elastic projections 3 on the surface 1a of the sheet 1 is essential.

Figure 3:
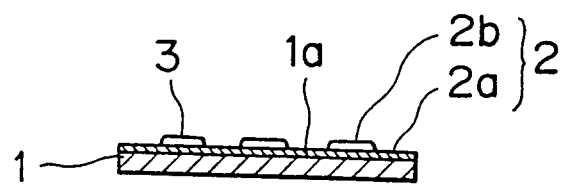
FIG. 3 and FIG. 4 are sectional views showing respectively other embodiments applied on the upper surface of the grip tape according to the present invention.
Figure 4:
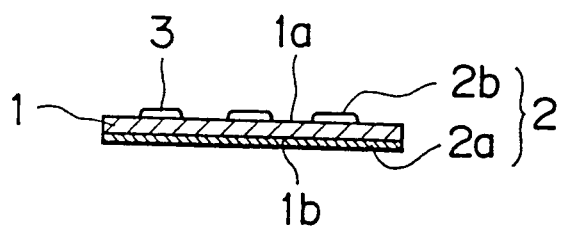

This synthetic resin elastic layer 2 is formed in various methods as by piling up a resin-printed layer 2b on the resin-coated layer 2a which is formed on the surface 1a as shown in FIG. 3, or by forming the resin-printed layer 2b on the upper surface 1a just like FIG. 1, but the resin-coated layer 2a on the rear surface 1b as shown in FIG. 4.

Figure 5:
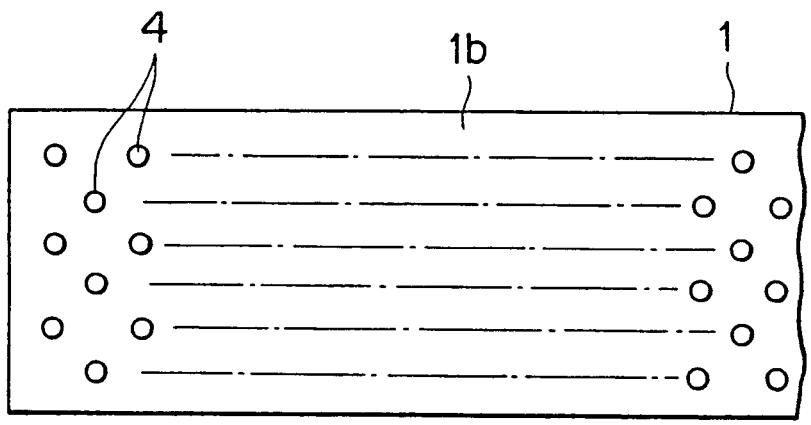
FIG. 5 shows a plan view of an embodiment applied on the rear surface of the grip tape according to the present invention.
Figure 7:
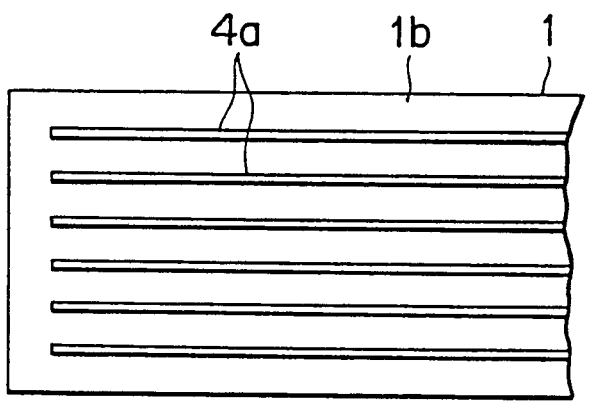
FIG. 7 and FIG. 8 are plan views showing respectively other embodiments applied on the rear surface of the grip tape according to the present invention.
Figure 8:
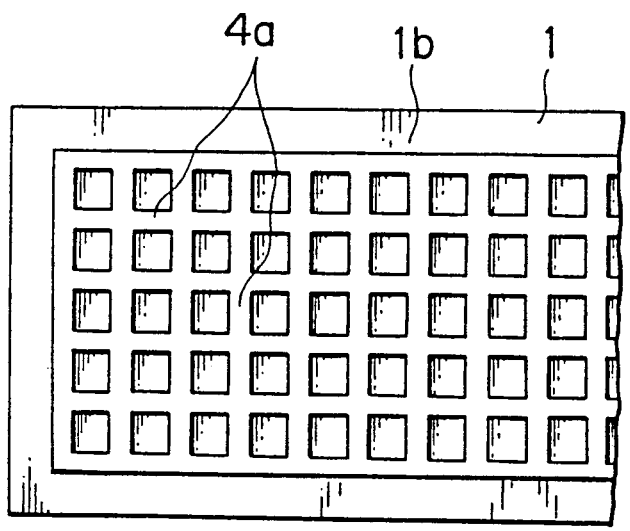

As for embodiments on the rear surface, as shown in FIG. 5, many of the elastic foam-expanded layer 4 are protrudingly formed in a dotted pattern, but it can also be formed differently by forming the projections 4a in any other desired pattern such as a striped pattern, checkwise pattern, or in a mesh-like pattern apart from the above dotted pattern as shown in FIGS. 7 and 8. This elastic foam-expanded layer 4 can be easily formed by coating or printing a foam-expanded resin such as a foam-expanded polyurethane resin, a foam-expanded styrene-butadiene resin or its emulsion by using a screen or the like. The optimum height of the elastic foam-expanded layer 4 can be from 0.1 mm to 1.0 mm.

Figure 6:
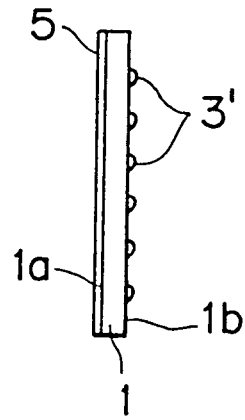
FIG. 6 is a sectional view of the embodiment as shown in FIG. 5.

In FIGS. 5 and 6, 5 denotes a transparent protective film with the thickness between $10\mu$ and $30\mu$, which is composed of polyethylene or polyvinylidene chloride of low density, and can preserve the surface preferably by sticking it thereto so as to protect the plain flexible sheet and also to protect from the blocking. This may also be an exfoliative type.

In the grip tape according to the present invention, since the porous flexible sheet 1 composed by coating a polyurethane on a nonwoven fabric has moderate flexibility and elasticity, it provides the user with a smooth touch feeling with the effect of much reducing the impact transformed to the grip on the moment the ball is hit, and also because of the numerous thin holes on the surface, the moisture caused by the user's sweat or by rain is rapidly soaked up to make it an unslippery grip.

Besides, by forming projections 3 produced by applying a synthetic resin elastic layer 2, and also by forming an elastic foam-expanded layer 4 or 4a on the rear surface 1b, the grip can be easily treated, providing at the same time the increased non-slip and shock-absorbing effects. Furthermore, because of those synthetic resin elastic layer 2 on the upper surface 1a and the elastic foam-expanded layer 4 on the back surface 1b, those materials elastically shrink when the user grips the grip part, and the grip gets to fit his hand so that the most comfortable touch feeling is provided.

As explained above, since the grip tape according to the present invention has projections on the surface of the porous flexible sheet by providing a synthetic resin elastic layer thereon, the non-slip and shock-absorbing effects become much larger, by which so-called an "elbow pain" can be much reduced. Furthermore, as the synthetic resin elastic layer on the upper surface and the elastic foam-expanded layer on the rear surface are easily applied to the flexible sheet by coating or printing the resin liquid, the conventionally adopted device for fusion or adhesion thereto is not required, so that its production becomes easy, contributing to the reduction of producting cost.

What is claimed is:

1. A grip tape comprising a porous polyurethane-coated flexible sheet having first and second surfaces and a elastic synthetic resin layer comprising a plurality of elastic synthetic resin projections arranged in a predetermined pattern on at least one of said first and second surfaces.

2. A grip tape according to claim 1, wherein said projections are made from a material selected from the group consisting of urethane, acrylate, EVA, silicon resin, latex and PVC.

3. A grip tape according to claim 1, wherein said pattern of said plurality of elastic synthetic resin projections is arranged on one of said first and second surfaces and the other of said first and second surfaces is covered with a transparent film made from polyethylene or low density polyvinylidene chloride.

4. A grip tape according to claim 1, wherein the thickness of said porous polyurethane-coated flexible sheet is from 0.4 to 0.8 mm.

5. A grip tape comprising a porous polyurethane-coated flexible sheet having first and second surfaces and a elastic synthetic resin layer formed of a foam-expanded material comprising a plurality of elastic resin projections made of said foam-expanded material arranged in a predetermined pattern on at least one of said first and second surfaces.

6. A grip tape according to claim 5, wherein said foam-expanded material is selected from polyurethane resin and styrene-butadiene resin.

7. A grip tape according to claim 5, wherein said elastic resin projections are from 0.1 to 1.0 mm high.

* * * * *